(12) United States Patent　　(10) Patent No.: 　US 8,833,343 B2
Pursifull et al.　　(45) Date of Patent: 　Sep. 16, 2014

(54) FUEL SYSTEM FOR IMPROVED ENGINE STARTING

(75) Inventors: Ross Dykstra Pursifull, Dearborn, MI (US); Dequan Yu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1891 days.

(21) Appl. No.: 11/871,492

(22) Filed: Oct. 12, 2007

(65) Prior Publication Data

US 2009/0095259 A1　Apr. 16, 2009

(51) Int. Cl.
*F02D 41/06* (2006.01)
*F02D 41/30* (2006.01)
*F02M 59/44* (2006.01)
*F02M 59/42* (2006.01)
*F02D 41/40* (2006.01)
*F02M 69/54* (2006.01)

(52) U.S. Cl.
CPC ........... *F02D 41/406* (2013.01); *F02M 59/447* (2013.01); *F02D 2200/0602* (2013.01); *F02D 41/065* (2013.01); *F02M 59/42* (2013.01); *Y02T 10/44* (2013.01); *F02M 69/54* (2013.01)
USPC ........... 123/457; 123/458; 123/459; 123/456; 123/445; 123/446

(58) Field of Classification Search
CPC .................. F02D 41/06; F02D 41/062; F02D 41/3836–41/3872; F02D 41/065; F02M 63/024; F02M 63/023–63/0255
USPC ......... 123/375, 370, 457, 445, 351, 390, 387, 123/467, 381, 549, 198 D, 198 DB, 447; 417/368, 307, 540; 701/101–105
See application file for complete search history.

(56) References Cited

U.S. PATENT DOCUMENTS

| 5,327,872 | A | | 7/1994 | Morikawa | |
| 5,598,817 | A | | 2/1997 | Igarashi et al. | |
| 5,626,114 | A | * | 5/1997 | Kushida et al. | ........... 123/198 D |
| 5,651,347 | A | | 7/1997 | Oi et al. | |
| 5,839,413 | A | * | 11/1998 | Krause et al. | ................. 123/447 |
| 5,918,578 | A | * | 7/1999 | Oda | ............................ 123/456 |

(Continued)

FOREIGN PATENT DOCUMENTS

| CN | 1811156 A | | 8/2006 | |
| EP | 0922850 | | 6/1999 | |
| JP | 2006207499 A | * | 8/2006 | ................... 123/447 |

OTHER PUBLICATIONS

Partial Translation of Office Action of Chinese Application No. 200810169947.X, Issued Jul. 3, 2012, State Intellectual Property Office of PRC, 7 Pages.

*Primary Examiner* — Lindsay Low
*Assistant Examiner* — Kevin Lathers
(74) *Attorney, Agent, or Firm* — Julia Voutyras; Alleman Hall McCoy Russell & Tuttle LLP

(57) ABSTRACT

A system and method for operating a fuel system that supplies fuel to a plurality of injectors in an internal combustion engine via a first pump and a second pump with a bypass circuit returning fuel from between the first and second pumps to a fuel tank, the pumps connected in series, is provided. The bypass circuit increases its restriction to increase injection pressure during selected conditions.

12 Claims, 4 Drawing Sheets

(56) References Cited

U.S. PATENT DOCUMENTS

| | | |
|---|---|---|
| 6,135,090 A | 10/2000 | Kawachi et al. |
| 6,367,455 B2 | 4/2002 | Hirata et al. |
| 6,382,184 B2 | 5/2002 | Nakamura et al. |
| 6,889,656 B1 * | 5/2005 | Rembold et al. ............ 123/446 |
| 6,988,488 B2 | 1/2006 | Pursifull et al. |
| 7,066,152 B2 | 6/2006 | Stroia et al. |
| 2003/0209232 A1 * | 11/2003 | Hou ........................... 123/459 |
| 2004/0206338 A1 | 10/2004 | Pursifull et al. |
| 2004/0250795 A1 | 12/2004 | Stroia et al. |

* cited by examiner

FUEL SYSTEM FOR IMPROVED ENGINE STARTING

BACKGROUND AND SUMMARY

Engines with direct cylinder injection may utilize various configurations of pumps to deliver fuel to the cylinders. One example includes a dual stage fuel pump system. The dual stage fuel pump system may have two pumps connected in series allowing the pressure to be increased in each of two stages. The two stage system allows the size and power of the high pressure pump to be reduced, and also may allow the fuel to reach a higher injection pressure of under certain conditions. Further, such fueling systems may utilize a bypass that recirculates fuel back into the fuel tank. For example, fuel may be recirculated when the amount of fuel required by the injectors is decreased or the operation of the higher pressure pump and the injectors are stopped. Systems where the circulation occurs within or near the fuel tank are known as Mechanical Return-less Fuel Systems (MRFS).

One such example system is described by U.S. Pat. No. 6,135,090, which utilizes a pressure regulator that bypasses the low pressure pump allowing fuel to flow back into the fuel tank. In the example of '090, the regulation of the pressure at the bypass is electronically controlled by a CPU to allow the fuel system to deliver fuel to the injectors at three pressures levels.

The inventors of the present application have recognized various issues with such an approach. For example, during starting, the accuracy of pressure control at the bypass, and the response of the pressure control at the bypass, may degrade.

Further, the inventors herein have also recognized that certain engine operating conditions, such as a hot restart, may require a high lift pump pressure for a short time. One of those conditions may include operation during the engine start sequence when the fuel rail requires refilling and re-pressurization, that is, to pressurize the fuel vapor into fuel liquid. Another condition may be when the fuel lines are experiencing vapor lock (i.e. when vapor is formed in the fuel lines). The high lift pump pressure may be used to fill the fuel rail rapidly. A fully filled fuel rail may be a prerequisite for an engine-driven, positive displacement pump to be fully effective in raising fuel rail pressure.

One approach to at least partially address the above issue, as well others, may include a method for operating fuel system that supplies fuel to a plurality of injectors in an internal combustion engine via a first pump and a second pump with a bypass coupled between the first and second pump for returning fuel to a fuel tank, the pumps connected in series. The method comprises: before actuating fuel injectors during an engine start, operating the first pump, where fuel is driven through the bypass that generates increased fuel pressure delivered to the injectors increasing with said fuel flow rate driven through the bypass; and during actuation of the fuel injectors after an engine start, operating the first and second pumps, where fuel pressure is regulated at a specified pressure via bypass flow in the bypass.

For example, pressure generated by the first pump before the injectors are actuated can be used to advantage to provide increased pressure for the first injection before the second pump has generated significant pressure, or in addition to any pressure generated by the second pump. Further, by reducing the bypass fuel flow rate during injector actuation, fuel system energy efficiency can be increased while heat transfer to the fuel is reduced. In this way, it is possible to, in one example, utilize mechanical components to generate such operation, and thus increase response time during the engine start. Further, it is possible to enable a high pressure to be reached in the fuel line during engine start up, increasing the efficiency and power of the engine, and improving cold start emissions.

Thus, at one point of operation, the short-duration objective is high pressure. The above approach can exploit the fact that this requirement occurs at what would normally be maximum bypass regulator flow rate. At other points of operation, the objective is minimum or zero bypass regulator flow rate to minimize lift pump electrical power consumption.

BRIEF DESCRIPTION

FIG. 2 shows a flow chart that illustrates the different mode that the Mechanical Return-less Fuel System (MRFS) operates in.

DETAILED DESCRIPTION

Figure 1:
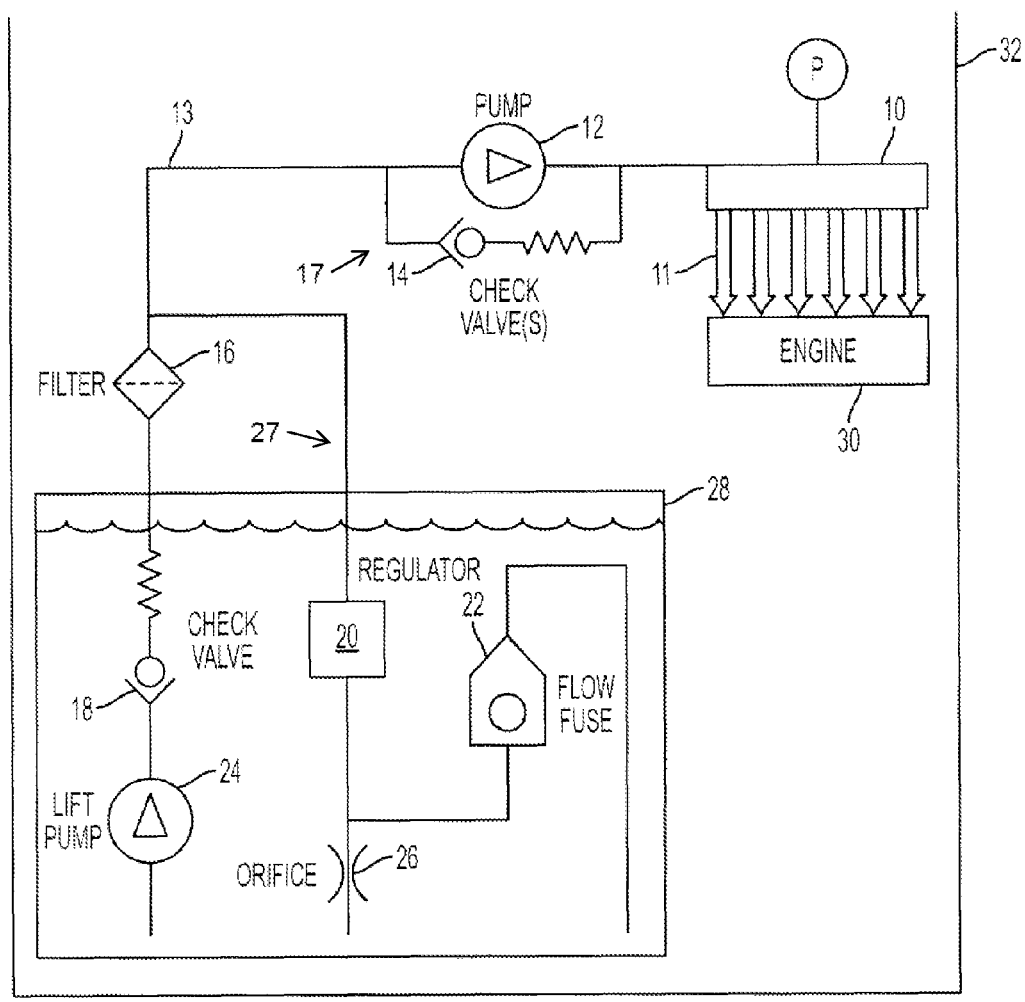
FIG. 1 show a schematic depiction of the fuel pumping system

FIG. 1 shows a schematic depiction of a fuel delivery system for an internal combustion engine. Device 32 allows fuel to be injected into a number of cylinders in an engine 30 over a range of pressures. The mechanical return-less fuel system MRFS includes a fuel tank 28 houses a lift pump 24, a check valve 18, an orifice 26, a regulator 20 and a flow fuse 22. Note that alternative embodiments may utilize alternative components and various components may be eliminated. For example, in one example embodiment, the flow fuse may be eliminated.

The MRFS may perform the following actions. A first action may reduce, and possibly minimize, the amount fuel that is re-circulated into the fuel tank via the fuel bypass line 17 while maintaining a substantially constant pressure downstream of the lift pump when the engine is operating, such as during normal engine running. A second action allows the fuel downstream of the lift pump to reach a higher pressure when fuel is no longer being delivered to the engine via the fuel injectors 11 via fuel rail 10. By performing these actions, in this example mechanically, the cost of the engine may be reduced by removing various sensors which are used in an electronic return-less fuel system. Alternatively, such actions may be used in combination with electronic systems.

Returning to FIG. 1, the lift pump is fluidly coupled to the check valve through a fuel line 13. In this embodiment, the lift pump may be electronically controlled and may operate in at least two modes, including a high duty cycle operating at approximately one hundred percent of capacity; and a variable duty cycle mode where a variety of speeds can be selected. In alternate embodiments, the pump may be configured to operate at one of two duty cycles. For example the lift pump may be configured to operate at 100% of capacity and 75% of capacity.

An engine 30, a pump 12, a check valve 14, a filter 16, and a series of fuel injectors 10 are located outside of the fuel tank. The filter, used to filter out impurities, is fluidly coupled to the check valve 18 through a fuel line that extends out of the gas tank. Bypass circuit 27 includes the orifice 26, the flow fuse 22, and the pressure regulator 20.

Figure 2:
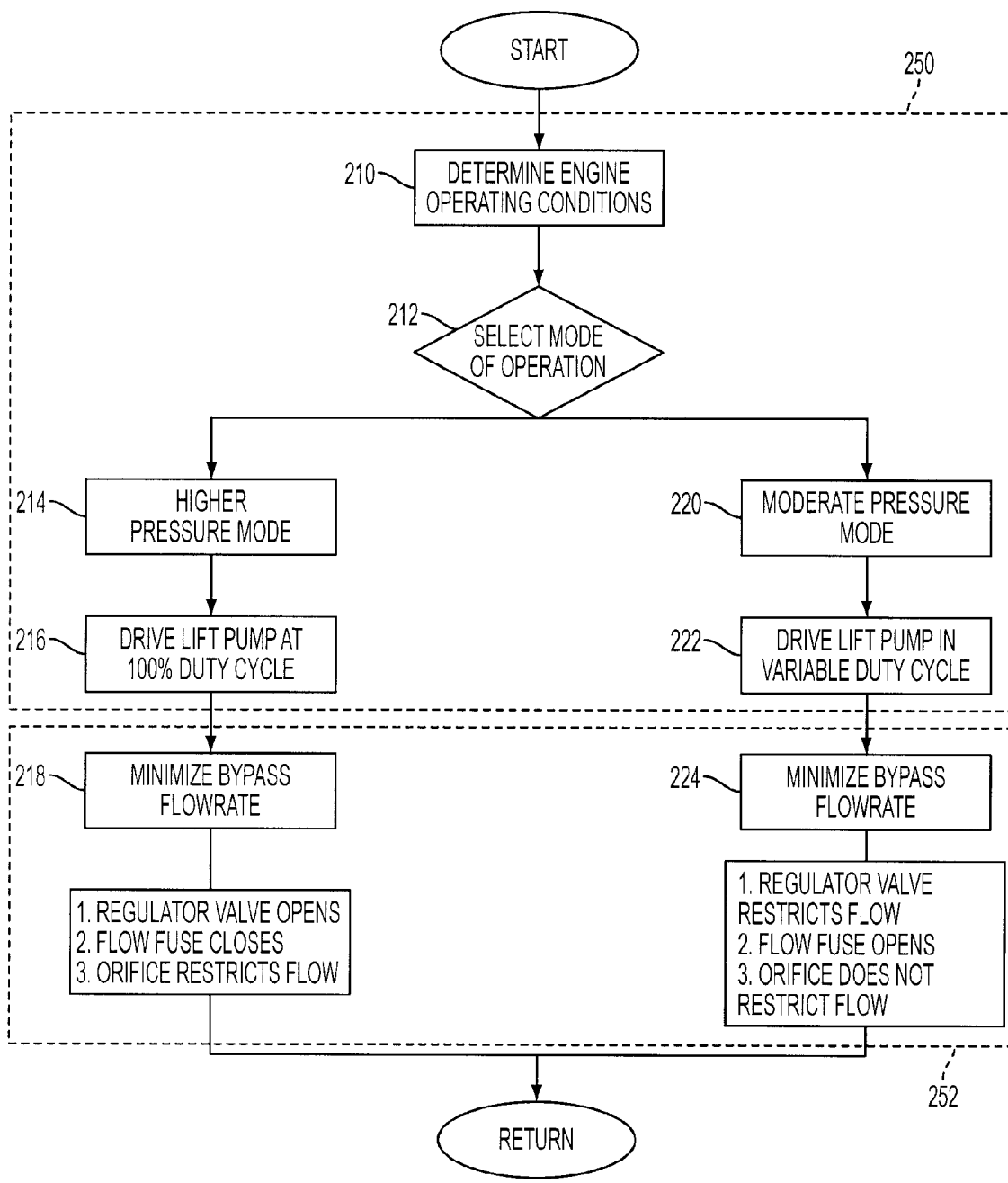

In the moderate pressure mode shown in FIG. 2, the bypass circuit returns fuel to the tank to maintain what is substantially a constant pressure (i.e. a bypass pressure regulator). In the high pressure mode, the bypass flow rate is restricted and the fuel line pressure increases. The bypass circuit reduces, and may minimize, the amount of fuel that is re-circulated into the fuel tank when the fuel injectors are in use, and thus the orifice 26 effectively operates as an insubstantial restriction in the return line. To transition into a high fuel line pressure mode, the system applies full electrical power to the pump during a period of low injector fuel flow rate. High lift pump flow rate with low injector flow rate yields a high bypass flow rate that triggers the high line pressure. Two potential mechanisms are shown in FIG. 1. One involves a flow fuse and an orifice and another involves only an orifice. Still others may also be used.

The flow fuse case operates as follows. When the flow through the bypass circuit is increased, the flow fuse is shut and substantially all the fuel flow is directed through the orifice. The orifice creates a back pressure when allowing a high pressure to be achieved when the flow rate of the fuel to the engine approaches zero.

The flow fuse may be stuck in this position if no provision for its "re-setting" was made. The orifice fluidly coupled in parallel to the flow fuse accomplishes this re-set mechanism. Further, the flow fuse allows fuel to travel through when the pressure differential or flowrate drops below a specified value, and closes when the pressure differential or flowrate through the flow fuse is over a specified value. In this embodiment if the pressure differential drops below 5 PSI or the flowrate through the flow fuse drops below 10 cubic centimeters per second CC/SEC the flow fuse opens. The flow fuse closes when the flowrate through the flow fuse is above 50 cubic centimeters per second CC/SEC. In alternate embodiments the specified pressure differentials or flowrates at which the flow fuse opens and closes may be changed depending on fuel composition or fuel system requirements. In this embodiment the flow fuse may include a check valve that contains a spring and a ball that seats and seals the passageway. In alternate embodiments the flow fuse may include other mechanism that allows the passageway to be sealed under certain conditions and open under other conditions. In other embodiments the flow fuse may be left out. This case yields the pressure characteristic shown in FIG. 3. Fuel line 13 then extends from the filter to a pump 12. Pump 12 controls the quantity and the pressure of the fuel which is delivered to the fuel injectors through the fuel line. One example of this pump may include a positive displacement pump that contains a mechanism for varying the volume of fuel that the pump can deliver. A bypass 17 may be provided for the fuel pump via check valve 14. This allows fuel to flow around the pump when the fuel line pressure exceeds the fuel rail pressure by a minimum amount (e.g. 11 psi). This flow, bypass around the high pressure pump, causes fuel to flow directly into a series of injectors 10 which deliver fuel to the engine. In this embodiment, the fuel injectors include a plurality of direct injectors. One example of this check valve may be a ball and spring valve that unseals at a specified pressure. In another embodiment (not shown) a number of check valves may be connected in series in the pump bypass. The check valve allows fuel to bypass pump 12 when the fuel injectors and the pumps is not being operated and a vacuum is created in the fuel rail downstream of the pump. Now referring to FIG. 2, a routine is shown depicting the modes in which the fuel pump may operate. Actions performed by the controller are shown in region 250. Actions performed by the mechanical components are shown in region 252. At 210 the engine operating conditions are assessed. The operating conditions may include crank angle, exhaust temperature, manifold pressure, exhaust gas composition, throttle position, and engine speed. The routine then proceeds to 212 where a mode of operation is selected, which include at least a high pressure mode and a moderate pressure mode of operation.

If the higher pressure mode is chosen the routine proceeds to 214. This mode is selected during a start up or directly before injection of the fuel when the engine fuel flow rate quickly declines to zero, such as during hot idle or initial fuel rail re-pressurization. The hot idle mode is operated during low engine fuel consumption.

The routine then proceeds to 216 where the lift pump is driven at 100% of capacity. During this time pump 12 and the fuel injectors are not being operated. This action rapidly increases the flow rate through the bypass circuit. This process is represented graphically in FIG. 3.

In 218, the flow rate through the bypass circuit is reduced, or possibly minimized via the mechanical configuration of the fuel system described in FIG. 1. The first action is that the regulator valve is open and all the flow is directed through the orifice and the flow fuse. The flow fuse then closes once it sees a flow rate larger than 50 CC/SEC. All the flow is then directed through the orifice. This is graphically represented by segment 314 in FIG. 3. The orifice then acts as a flow limiting device, creating a large back pressure that increases the pressure at which the fuel can be delivered during start up. In this embodiment the pressure delivered by the lift pump during start up is over 80 PSI. In alternated embodiments this pressure may be changed depending on the requirements of the system.

The second mode in which the system operates may include a moderate pressure mode 220. This mode is selected when the engine is warmed up and requires moderate to high engine fuel consumption. This mode may be implemented when the engine requires a moderate to large power output. This moderate pressure can be achieved while driving the lift pump at partial capacity over a range of flow rates. The lift pump consumes less electricity at this partial capacity when compared to the maximum capacity. This allows the pump system power consumption to be reduced and increases the durability of the lift pump.

In 222, the lift pump is driven in a variable duty cycle mode. This allows a variety of speed to be selected depending on the amount of fuel that is needed by the lift pump. In alternate embodiments the lift pump may only be driven at 75% of capacity in the second mode.

In 224, the bypass circuit flow rate is reduced, or possibly minimized. The regulator is partially open which impedes the flow through the bypass circuit. The flow fuse is open and fuel is traveling through it bypassing the orifice. Fuel is flowing through the orifice; however, the orifice back pressure created by the orifice is dissipated by the flow fuse which allows fuel to bypass the orifice. In alternate embodiments the flow fuse may be eliminated and the orifice may be configured in such a way that it does not substantially restrict the flow of fuel under lower flow rates. The routine then returns to the start.

Figure 3:
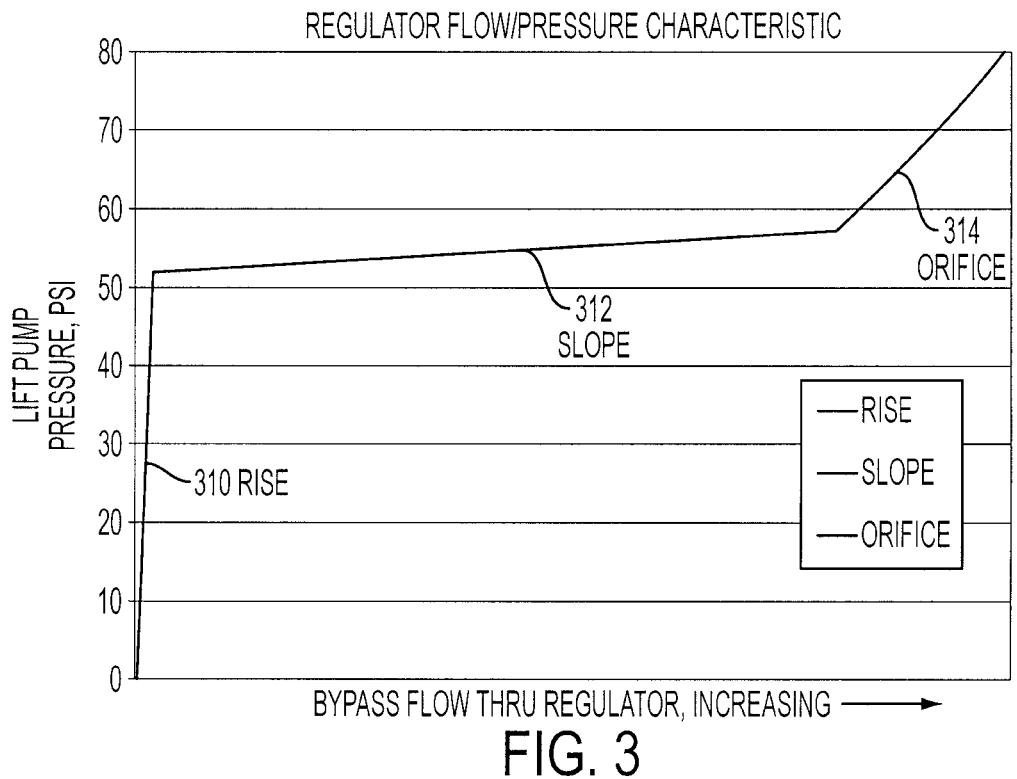
FIG. 3 shows a graph of the bypass characteristics.

FIG. 3 shows a graph depicting the bypass circuit characteristics when the flow rate through the bypass circuit increases due to a decrease in the amount of fuel required by the injectors. On the y axis is the lift pump pressure and on the x axis is the flowrate of fuel through the regulator. Initially when the operation of the lift pump has started the pressure in the fuel line downstream of the lift pump increases rapidly while the regulator flowrate just slightly increases due to the regulator being closed which restricts the flow through the bypass circuit. This is represented by segment 310.

Segment 312 represents the region when the bypass flowrate is increasing but the lift pump pressure only slightly increases. In this region the flow fuse is open and fuel is traveling through the flow fuse and the orifice. At a given fuel pump power level, the bypass circuit flow increases as the amount of fuel delivered by the injectors decreases.

Segment 314 on the graph shows a region where the flow fuse is shut off, impeding the flow of fluid to travel trough the bypass circuit. This in turn increases the flowrate through the orifice and the lift pump pressure. The increase in flowrate and lift pump pressure occurs when the fuel injectors do not require fuel or the flow rate through the injectors is approaching zero. This mode of operation may occur during engine start up or during a hot idle when a high fuel pressure is utilized.

Figure 4:
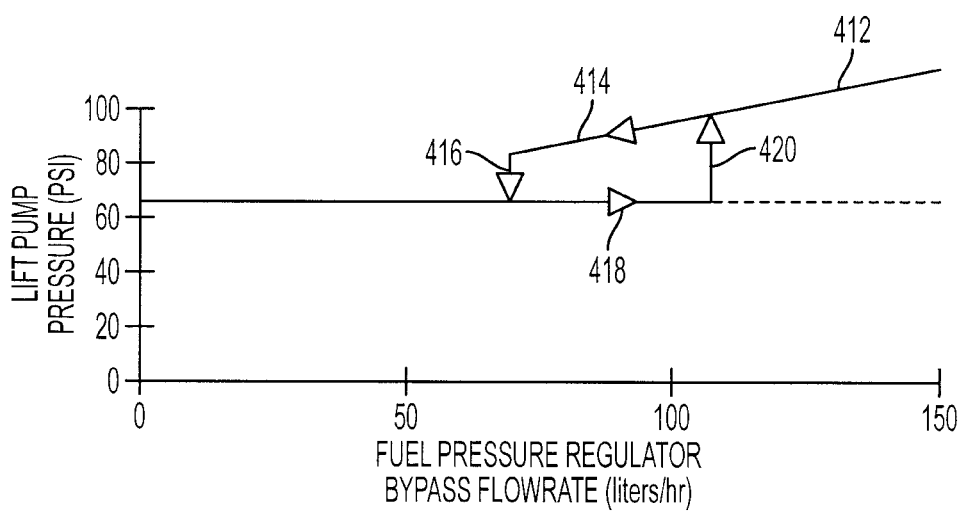
FIG. 4 shows how the lift pump pressure varies with the bypass flowrate during a high pressure mode of operation.

FIG. 4 shows how the fuel delivery system can decrease the pressure downstream of the lift pump after the lift pump has been operated in the high pressure mode as described in FIG. 2. Initially the graph is in a high pressure region shown in segment 412. The lift pump pressure and bypass circuit flow are decreased as shown in segment 414 because of an increase flow rate through pump 12 and the fuel injectors. The flow rate through the bypass circuit decreases because of the increased flow rate through the pump and the fuel injectors. Then in segment 416 the fuel bypass circuit flow rate is held substantially constant while the lift pump pressure decreased. The flow rate through the bypass circuit is held constant by the regulator.

Then, in segment 418 the flow rate through the bypass circuit increases because the flow fuse opens increasing the flow rate in the bypass circuit. Then in segment 420 the flow fuse closes, the orifice restricts the flow through the bypass circuit and the pressure of the lift pump increases. Segment 414 is again reached where the flow rate through pump 12 and the injectors increase and this cycle is again repeated. Pump 12 regulates the pressure and amount of fuel that is provided to the injectors not the lift pump so control of the bypass circuit is carried out mechanically. By performing these actions via the configuration of FIG. 1, the size and power consumption of the fuel system may be reduced, thereby increasing the efficiency of the system.

Figure 5:
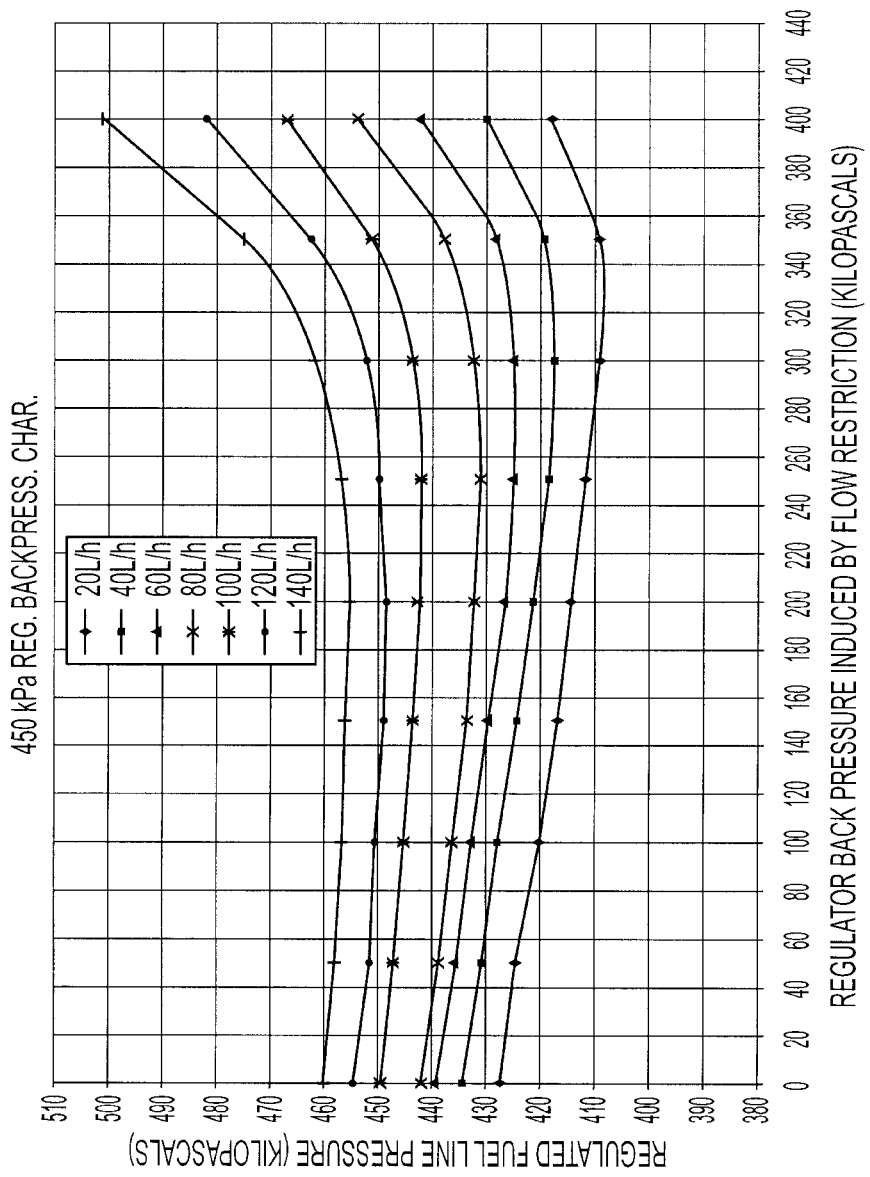
FIG. 5 shows an example regulator backpressure characteristics.

It should be appreciated that in the example the regular pressure vs. back pressure curve may have a relationship as shown in FIG. 5. In this example, the relationship is not a straight line (it has some dip), and thus the system may experience less current draw when the orifice 26 is placed downstream as shown in FIG. 1. In other words, the fuel pressure regulator may include a characteristic that improves current draw when the orifice (back pressure) is located specifically downstream of the regulator (e.g., as compared with upstream). The graph of FIG. 5 shows that for any given flow rate, the regulated pressure drops slightly when the regulator experiences back pressure, as would result from the orifice. The orifice characteristic would superimpose itself upon this graph and yield a curve very close to a desired function, which is more of a straight line (constant pressure) followed by a sharp pressure increase with high bypass circuit flow rate, as noted above herein. When operating at the base pressure during non-startup operation for example, this regulator curve results in lower current pump motor current than would be the case if the regulator curve itself was strictly horizontal (insensitive to back pressure).

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a fuel system that supplies fuel to a plurality of injectors in an internal combustion engine via a first pump and a second pump with a bypass circuit having a pressure regulator, an inlet coupled between the first and second pumps, the bypass circuit returning fuel to a fuel tank, the pumps connected in series, comprising;
   during a first engine start mode before actuating fuel injectors, operating the first pump, where fuel driven through the bypass circuit generates an increased back pressure and thus increased pressure between the pumps greater than a decreased pressure during a second mode of operation, the increased back pressure generated via an orifice in the bypass circuit positioned upstream of a first outlet to the fuel tank and via the pressure regulator being opened while a flow fuse coupled downstream of the regulator and upstream of the orifice is closed; and
   during the second mode during actuation of fuel injectors after engine starting, regulating the decreased pressure between the pumps via the regulator being partially opened and maintaining a substantially constant pressure, while operating the first and second pumps, the flow fuse open during the second mode.

2. The method of claim 1 where the injectors are coupled directly in cylinders of the engine, and where all fuel flow in the bypass circuit is delivered to the fuel tank.

3. The method of claim 2, where said orifice generates increasing back pressure with increasing bypass fuel flow rate.

4. The method of claim 3, where the flow fuse is arranged upstream of a second outlet to the fuel tank, the second outlet to the fuel tank distinct from the first outlet to the fuel tank.

5. The method of claim 4 where during said actuation of the fuel injectors, the decreased pressure is regulated to approximately 65 psi.

6. The method of claim 2 where the first pump is operated at a first level of actuation during the starting, and where the first pump is operated at a second, lower level, during actuation of the fuel injectors.

7. A fuel system for an engine, comprising:
   a fuel tank;
   a plurality of direct fuel injectors;
   a first electrically-actuated lift pump;
   a second mechanically-actuated pump coupled downstream of the first pump and upstream of the injectors;
   a bypass circuit having an inlet coupled between the first and second pumps, the bypass circuit having a first line with a first outlet coupled to the inlet and a second line with a second outlet coupled to the first line, an orifice arranged downstream of a pressure regulator and upstream of the first outlet in the first line, and a flow fuse arranged upstream of the second outlet in the second line, and the second line coupled to the first line downstream of the regulator and upstream of the orifice, the bypass circuit recirculating fuel back to the fuel tank via the first and second outlets; and a controller operating the first pump in at least two modes, the first mode operated before actuation of the injectors during an engine start or when the engine is experiencing vapor lock where the first pump is driven at 100% of capacity with the flow fuse closed and the flow directed through the orifice restricting flow and generating an increased pressure between the pumps, the second mode operated during actuation of the fuel injectors after engine start where the first pump is driven in a variable duty cycle with the flow fuse open and the regulator restricting flow and maintaining a substantially constant pressure downstream of the first pump by the regulator over a range of fuel flow rates.

8. The system of claim 7 wherein the second pump is a positive displacement pump that contains a mechanism for varying the volume of fluid that the pump can deliver.

9. The system of claim 8 further comprising a second bypass circuit having a check valve, the second bypass circuit coupled between the second pump and the fuel injectors, wherein fuel is transferred downstream of the second pump when fuel line pressure exceeds fuel rail pressure by a threshold amount.

10. The system of claim 9 wherein power provided to the first pump is minimized during the second mode of operation.

11. The system of claim 7 where the first mode includes a hot restart.

12. The system of claim 7 wherein the first and second lines are arranged in parallel downstream of the regulator.

* * * * *